United States Patent
Moon

(10) Patent No.: US 6,993,079 B2
(45) Date of Patent: Jan. 31, 2006

(54) VARIABLE LENGTH CODING METHOD

(75) Inventor: Ki Woong Moon, Daegu (KR)

(73) Assignee: LG Electronics Inc., Seoul (KR)

( * ) Notice: Subject to any disclaimer, the term of this patent is extended or adjusted under 35 U.S.C. 154(b) by 61 days.

(21) Appl. No.: 10/645,676

(22) Filed: Aug. 20, 2003

(65) Prior Publication Data

US 2004/0037360 A1    Feb. 26, 2004

(30) Foreign Application Priority Data

Aug. 24, 2002 (KR) .................. 10-2002-0050339

(51) Int. Cl.
*H04N 7/12* (2006.01)

(52) U.S. Cl. .............................................. 375/240.23

(58) Field of Classification Search ........... 375/240.23, 375/240.27, 240.13; 382/245–246
See application file for complete search history.

(56) References Cited

U.S. PATENT DOCUMENTS 5,835,144 A * 11/1998 Matsumura et al. ... 375/240.23
6,785,331 B1 * 8/2004 Jozawa et al. ......... 375/240.12

OTHER PUBLICATIONS

Saito et al, "VLSI Implementation Of A Complete Chip Set for An MPEG2 Real-Time Encoder", IEEE International Symposium on Circuits and Systems, vol. 2, pp. 660-663, May 1996.*

* cited by examiner

*Primary Examiner*—Vu Le
(74) *Attorney, Agent, or Firm*—Lee, Hong, Degerman, Kang & Schmadeka

(57) ABSTRACT

A variable length coding method is provided. The method comprises comparing corresponding portions of a present picture and a previous picture received by a video encoder; and performing coding by fixing a COD (coded macroblock indication) flag of the present picture at a certain value, if said corresponding portions are similar to each other.

29 Claims, 5 Drawing Sheets

VARIABLE LENGTH CODING METHOD

CROSS REFERENCE TO RELATED APPLICATION

Pursuant to 35 U.S.C. § 119(a), this application claims the benefit of earlier filing date and right of priority to Korean Patent Application No. 2002-50339, filed on Aug. 24, 2002, the content of which is hereby incorporated by reference herein in its entirety.

BACKGROUND OF THE INVENTION

1. Field of the Invention

The present invention relates to a video codec, and in particular to a variable length coding method in a video codec.

2. Description of the Background Art

In general, a signal to be transmitted or stored is described as columns of several symbols. Indicating each symbol as a code having a certain length is called coding. Herein, indicating each symbol as a code having the same length is called a fixed length coding, and indicating each symbol as a code having a different length is called VLC (variable length coding).

In the VLC, when each symbol is described with a code having a different length, a shorter length code is allocated to a symbol of comparatively high occurrence frequency, and a longer length code is allocated to a symbol of comparatively low occurrence frequency. Accordingly, a signal can be described with a less bit quantity in comparison with that of the fixed length coding allocating the same length code to all symbols.

In comparison with the fixed length coding, the VLC is efficient in compressing information quantity of a signal, however it may be inefficient in radio circumstances in which channel errors occur frequently. That is, when a code describing a certain symbol is affected by influences of a channel error, only a pertinent symbol is lost in the fixed length coding. However, in the VLC, because each code about each symbol has an inherent length, not only a pertinent symbol but also consecutive following codes may be lost. Accordingly, various methods for detecting a channel error in radio environment have been presented in a VLC process of a H.263 video codec as defined by the 3GPP ($3^{rd}$ generation partnership program) Standard.

FIG. 1 is a block diagram illustrating a general video communication system. As depicted in FIG. 1, the video communication system is largely divided into a transmitting unit and a receiving unit. The transmitting unit includes a camera 101 and a H.263 encoder 102 for encoding pictures photographed by the camera 101 into H.263 and transmitting them wirelessly. Accordingly, pictures photographed by the camera 101 are encoded by the H.263 encoder 102 and are transmitted to the receiving unit through a radio channel.

The receiving unit includes a video decoder 103, an error detector 104, an error corrector 105 and a display 106. The H.263 decoder 103 decodes a H.263 bit stream transmitted through the radio channel into MPEG or H.263 format, and the error detector 204 detects a channel error from the decoding signal. Accordingly, the error corrector 105 corrects or conceals the detected error and displays it through the display 106. Herein, the error is corrected by using a correctly decoded previous picture portion or a present picture portion.

In general, in order to eliminate spatial and temporal redundancy, the H.263 encoder respectively uses a DCT (discrete cosine transform) method and a MC (motion compensation) method. In the DCT method for eliminating correlation of data through two-dimensional spatial conversion, spatial conversion is performed about a picture by a 8 pixel×8 pixel block unit. Herein, because the spatial-converted data tend to gather together to one side, they are transmitted after being quantized.

In temporally consecutive pictures, motion of a person or an object is mainly shown on the central portion of a screen. By using the characteristic, temporal redundancy is eliminated in the MC method. In more detail, by filling an unchanged portion (or a portion having the minimum change) with a similar portion taken from a previous picture, it is possible to minimize data quantity to be transmitted. As described-above, finding the most similar macroblock between pictures is called ME (motion estimation), and describing degree of motion as displacement is called motion vector.

FIG. 2 is a block diagram illustrating a construction of a general H.263 encoder. As depicted in FIG. 2, when a present macroblock of an input picture is not similar to any macroblock of a previous picture, a coding controller 202 controls the video communication system so as to be in an Intra mode, when there is a similar macroblock, the coding controller 202 controls the video communication system so as to be in an Inter mode. In the Intra mode, a first switch 201 outputs an input picture to a DCT unit 204 according to a mode control signal outputted from the coding controller 202. In the inter mode, the first switch 201 outputs an input picture to a compensator 210.

If a determined mode is the Intra mode, an input picture is inputted to a VLC 203 through a DCT unit 204 and a quantizer 205 regardless of a previous picture, and the VLC 203 codes the inputted picture by using a mode control signal outputted from the coding controller 202 and a quantization parameter.

On the other hand, when a determined mode is the Inter mode, a previous picture restored through an inverse quantizer 206 and an inverse DCT 207 is stored in a frame buffer 209. By using the previous picture stored in a frame buffer 209 and the present input picture received through the first switch 201, a motion estimator 211 searches the most similar macroblock (of a previous picture) with a present macroblock. A motion compensator 210 compensates the macroblock according to a motion vector outputted from the motion estimator 211, and a first subtracter 200 outputs the difference between the present macroblock and the motion-compensated macroblock. Accordingly, a difference picture is finally encoded in the VLC 203 through the DCT unit 204 and the quantizer 205 and is transmitted.

A second switch 212 outputs the motion-compensated macroblock to an adder 208. The adder 208 adds the motion-compensated macroblock to the previous picture and outputs it to the frame buffer 209. After sampling input data by a 8×8 unit, the input data is DCT-converted in the DCT unit 204, and conversion coefficients are quantized in the quantizer 205 according to a compression ratio. In the quantized data, the VLC 203 encodes data of comparatively high occurrence frequency into a small codeword, the VLC 203 encodes data of comparatively low occurrence frequency into a long codeword, and accordingly a final data compression effect can be obtained. In the coding method, in order to obtain high compression ratio and maximize efficiency of coding, a method for performing coding independently by macroblock units is used.

FIG. 3 shows a H.263 bit stream. The H.263 bit stream outputted from the VLC 205 is divided into four layers, a block layer, a macroblock layer, a GOB (group of block) layer and a picture layer. The block layer consists of 8×8 pixels and is the lowest layer. The macroblock layer consists of four luminance blocks and two chrominance blocks. In addition, the GOB block consists of plural macroblock layers (nine macroblock layers in case of a QCIF (quarter common intermediate format) size), and the picture layer consists of plural (nine in case of the QCIF size) GOB layers.

FIG. 4 is a block diagram illustrating the macroblock layer of FIG. 3. The macroblock layer is largely divided into a header portion and a block data portion. The header portion includes a COD (coded macroblock indication) flag for indicating coding or non-coding of a macroblock; a MCBPC (macroblock type & coded block pattern for chrominance) flag having coding pattern information about a macroblock mode and a chrominance block; a CBPY (coded block pattern for luminance) flag having coding pattern information about a luminance block; a DQUANT (differential value of quantization parameter) flag having a quantization step size, namely, compression degree information.

Also included in the MB header is a MVD (motion vector data) flag; and block data having result information (texture) by DCT-quantization process by each block. The MVD is not a motion vector value itself of a present macroblock but a difference between a motion vector of the present macroblock and an estimated motion vector, and it is for improving coding efficiency by reducing a bit quantity.

The coding process in accordance with the related art is provided below with reference to the macroblock layer and accompanying FIG. 5. First, on the basis of a mode control signal received from the coding controller 202, the VLC 203 determines whether a picture type of a frame including a present macroblock is a P-picture (i.e., Inter Picture) or an I-picture (i.e., Intra Picture) as shown at step S501. If it is a P-picture, a certain value is written in the COD flag as shown at step S502. When there is no motion information in the present macroblock and all six blocks do not have texture information (as '0'), the COD flag is '1'. Except, if the COD flag is '0' as shown at step S503.

Accordingly, when the COD flag is '1', then a next macroblock is coded. However, when the COD flag is '0', then the following steps are performed. In addition, when it is the I-picture in the judgement result, the MCBCP flag and the CBPY flag are written without writing the COD flag as shown at steps S504 and S505. Herein, the MCBPC flag indicates a format of the macroblock and a pattern about two color differential signal blocks, and the CBPY flag indicates a pattern about four brightness signal blocks. The pattern respectively indicates existence of texture information about six blocks including color difference and brightness in the macroblock.

Afterward, the DQUANT flag is written. The DQUANT flag is for showing a difference between a previously written QP and a present macroblock QP, and it is used for adjusting compression degree in the coding control unit 202. Accordingly, when the macroblock mode is in the Inter mode or the Intra mode, because DQUANT is 0, it is skipped without being written as shown at steps S506 and S507.

Afterward, a motion vector difference value is written. Herein, motion vector exists only in the Inter macroblock, and it shows how far the nearest previous frame is separated from the present macroblock in x and y directions. In the video coding, instead of coding the motion vector as it is, a value different from a predicted motion vector is coded. It is called a MVD. Accordingly, in cases except the Intra mode macroblock, the MVD flag has to be written. However, in the Intra mode macroblock, there is no need to write as shown at steps S508 and S509.

As described above, after passing the coding process in the encoder, when the coded macroblock is transmitted through a channel, a certain receiver (not shown) is received it and decodes it.

In general, in the H.263 decoder, when a symbol about a certain bit stream does not exist in a code book or a code table (invalid code), it is detected as an error. However, in the error detecting method, when an error-occurred bit stream exists in a code book accidentally, it is impossible to find an accurate error occurrence position.

For example, when an error occurs in a bit stream actually, because misconception probability is far more great than "invalid code" judgement probability, error may not be detected in the conventional error detecting method using the code book, although an error is detected, it may be detected always later than an actual error occurrence.

In a channel error occurrence, "invalid code" occurrence probability in the H.263 decoder is the probability in which a code word not in the code book occurs.

MCBPC code table for P picture: 0.110%
MCBPC code table for I picture: 1.37%
CBPY code table: 3.125%
MVD code table: 0.061%
TCOEF (quantized transform coefficient) code table: 0.195%

As described above, in the detecting method using the code book, a main cause of detection error occurrence by a macroblock unit is an 1 bit COD flag as initial information about a macroblock. Herein, the COD flag indicates whether a macroblock is coded, when a certain macroblock is almost similar to a macroblock of a previous picture, the COD flag is set as '1', and texture information is transmitted without being coded. It is mainly applied for a macroblock at a background portion in which there is no motion in a picture.

Accordingly, when the receiver misunderstands a value of the COD flag, a detection error can occur greatly. In more detail, because of motion of the camera 101, when a present picture is not similar to a previous picture, a COD flag of all macroblocks of the present picture is set as '0', and texture information and motion information are coded-transmitted.

However, when an error occurs in a certain macroblock of the coded picture, if the H.623 decoder 103 of the receiver does not detect an error-occurred macroblock, it loses synchronization starting from a next macroblock, and accordingly it reads a COD wrong.

And, when a COD flag value of a macroblock losing synchronization is '1' consecutively, an error of a macroblock as the number of '1' can not be detected, due to that, a macroblock is decoded wrong, and accordingly detection error is increased as the number of macroblocks.

SUMMARY OF THE INVENTION

In accordance with one or more embodiments, a variable length coding method comprises comparing corresponding portions of a present picture and a previous picture received by a video encoder; and performing coding by fixing a COD (coded macroblock indication) flag of the present picture at a certain value, if said corresponding portions are similar to each other. The corresponding portions comprise at least one macroblock each. The certain value is approximately equal to "0".

In some embodiments a MCBPC (macroblock type & coded block pattern for chrominance) flag is set equal to a first value, approximately equal to "1", for example. A CBPY (coded block pattern for luminance) flag is set equal to a second value is approximately equal to "11", for example. A MVD (motion vector data) flag is set equal to a third value, approximately equal to "0", for example.

In certain embodiments a variable length coding method comprises determining a coding mode of a macroblock; setting a COD (coded macroblock indication) flag of a macroblock header to a first value, when a coding mode of the macroblock is determined to be in an Inter mode; setting a MCBPC (macroblock type & coded block pattern for chrominance) flag to a second value; setting a CBPY (coded block pattern for luminance) flag to a third value; and setting a MVD (motion vector data) flag a fourth value.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENT

In accordance with one or more embodiments of the invention a method for reducing a detection error due to a COD value in a graphic decoder (e.g., a H.263 decoder) is provided. Accordingly, a variable length coding is performed to fixing a COD flag of a macroblock, at a first value (e.g., '0') and detecting an error by checking, for example, a COD flag arranged at the first value, although an error is not detected in a previous macroblock.

Figure 1:
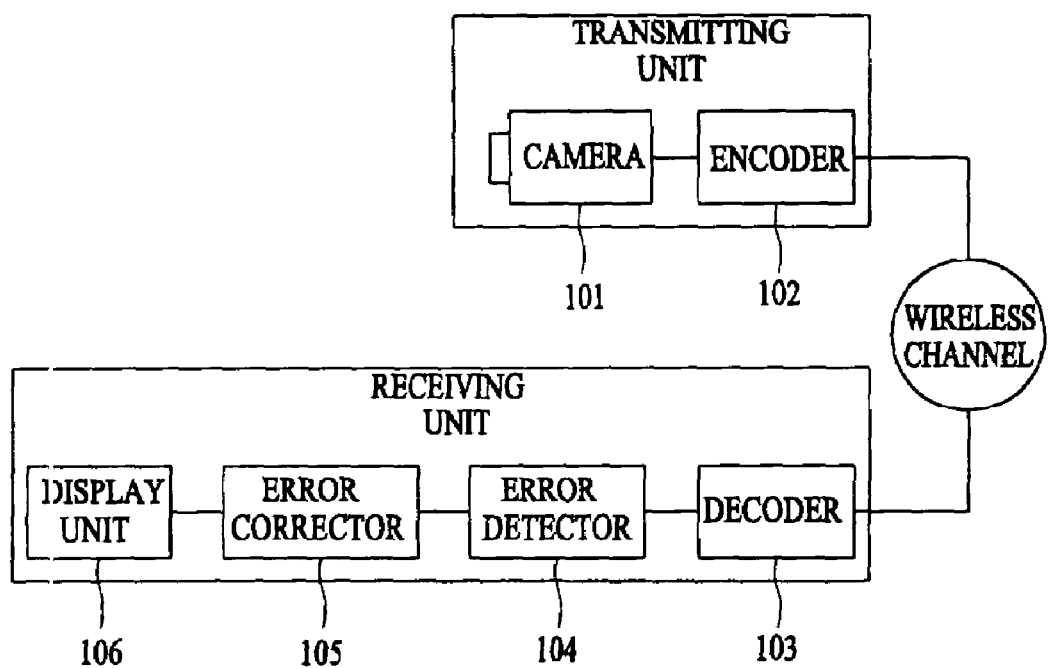
FIG. 1 is a block diagram illustrating general video communication.
Figure 2:
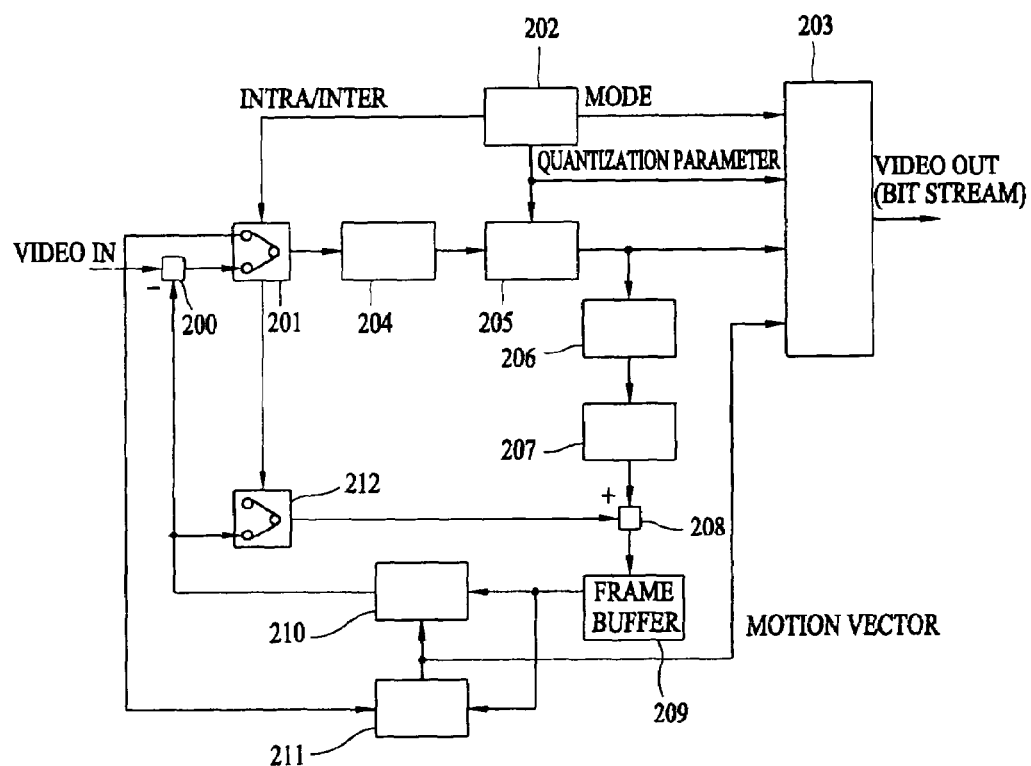
FIG. 2 is a block diagram illustrating a construction of a general H.263 coder.
Figure 3:
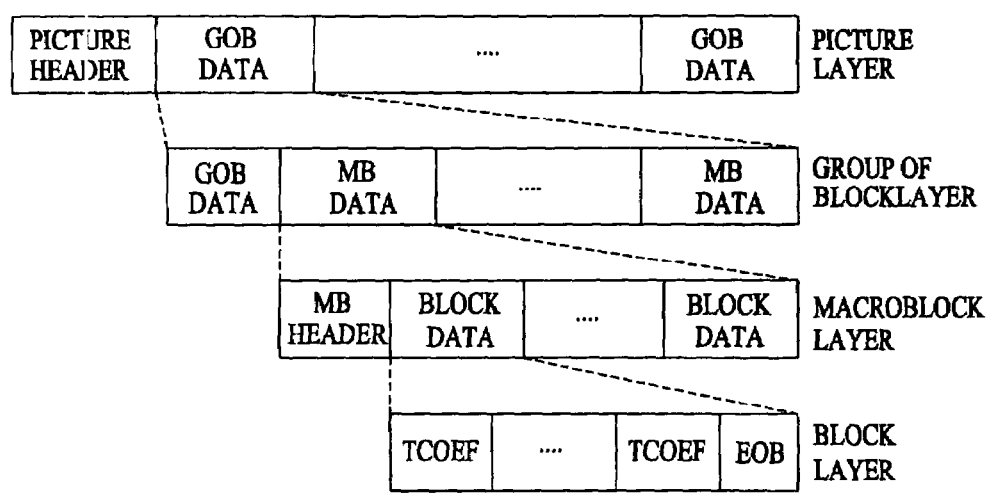
FIG. 3 is an exemplary view illustrating a layer construction of a H.263 bit column.
Figure 4:
FIG. 4 is an exemplary view illustrating macroblock layer syntax in FIG. 3.
Figure 5:
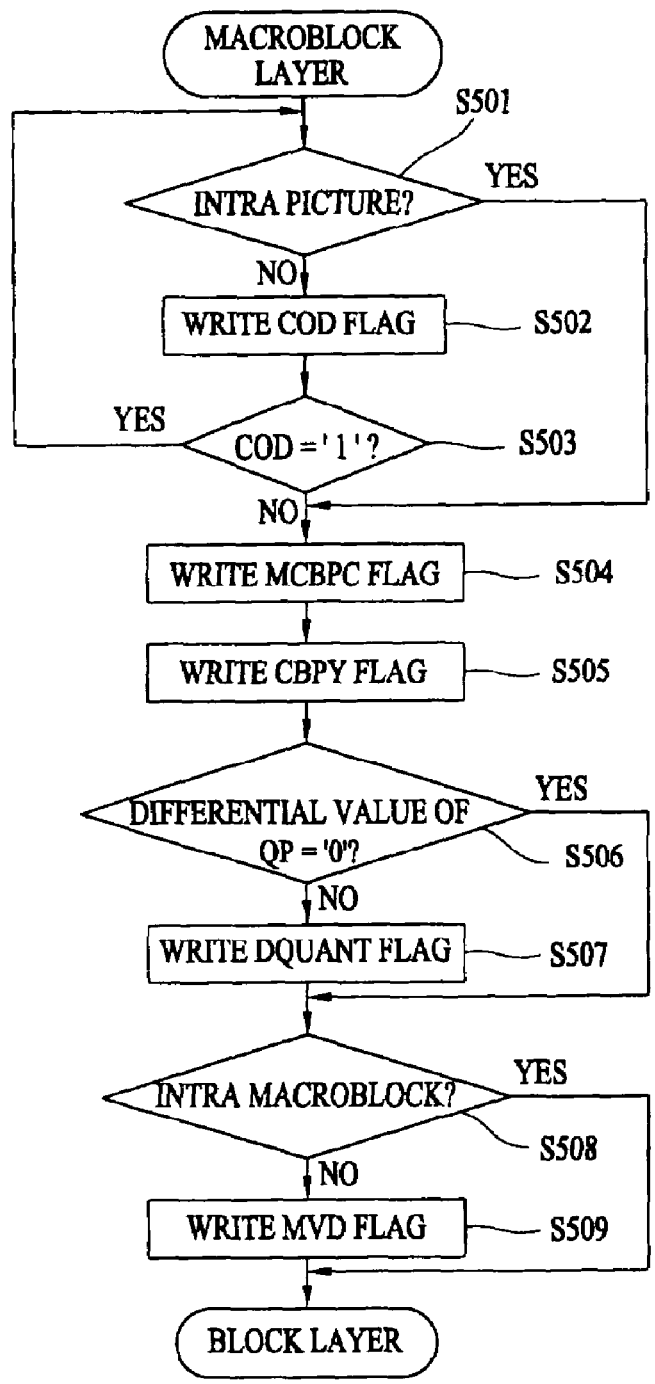
FIG. 5 is a flow chart illustrating a macroblock layer syntax setting method in variable length coding in accordance with the conventional art.
Figure 6:
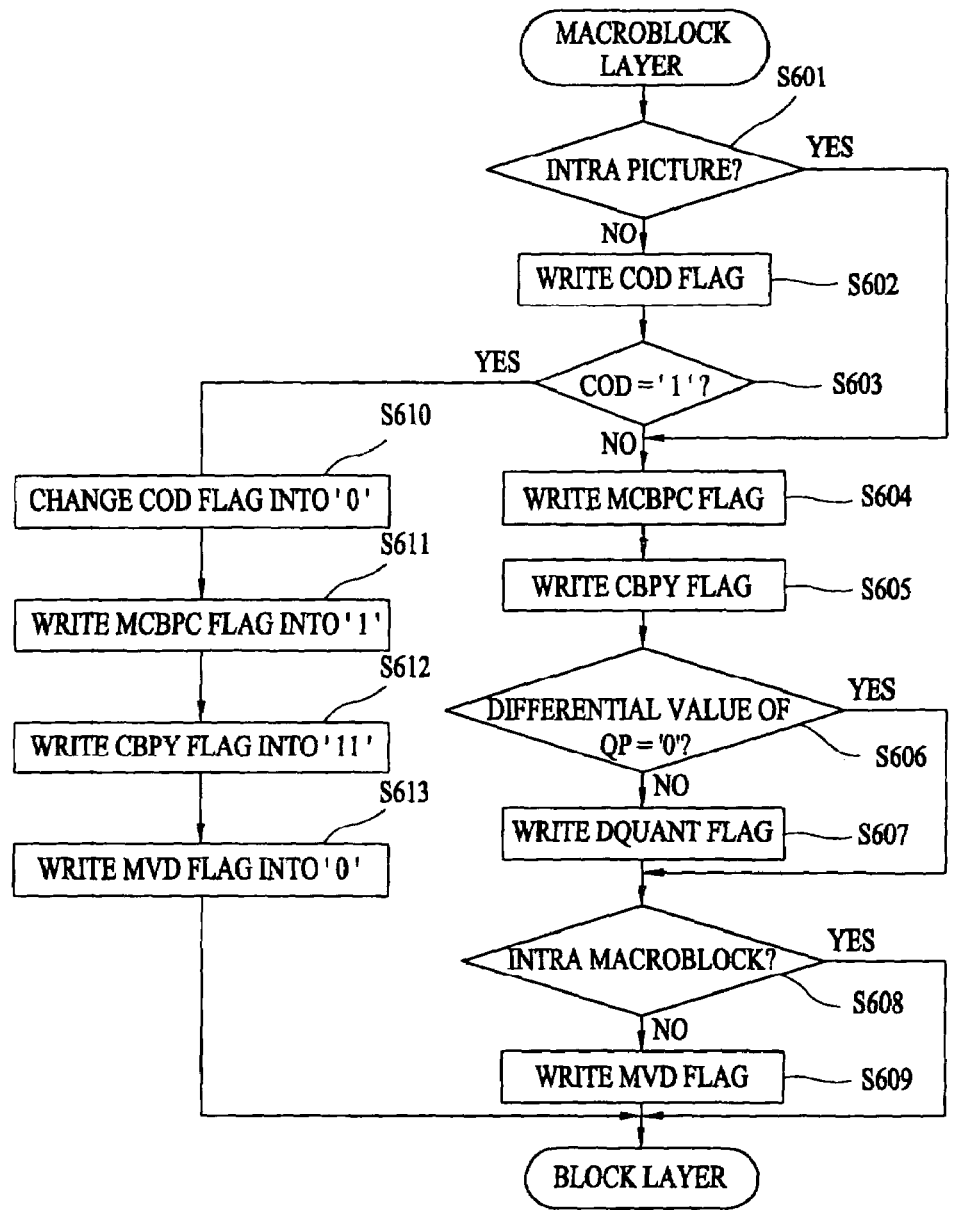
FIG. 6 is a flow chart illustrating a macroblock layer syntax setting method in variable length coding in accordance with the present invention.

Referring to FIG. 6, a VLC 203 determines at step S601 whether a picture type of a frame in which a present macroblock is included is a P-picture or an I-picture on the basis of a mode control signal received from a coding controller 202. If it is a P-picture, a certain value is written on a COD flag as shown at step S602. For example, when there is no motion information in a present macroblock and the blocks do not have texture information (i.e., '0'), the COD (coded macroblock indication) flag is set to a predetermined value, such as '1', for example. Otherwise, the COD fag is set to a default value, such as '0', for example.

If the inputted frame is a P-picture, the COD flag is written. However, when the inputted frame is not a P-picture, at step S604, the MCBPC Flag is written as described in further detail below. If the inputted frame is a P-picture, then it is determined if a COD flag is of a predetermined value (e.g., 1 or 0), for example, as shown at step S603. If the COD flag is '1', for example, then the COD flag is written as '0', a MCBPC flag is written as '1', and a CBPY flag is written as '11'.

In some embodiments, a MVD flag is written as '0'. That means a present macroblock is almost the same as a macroblock at the same position of a previous frame, and that the macroblock can be used as it is. In more detail, in order to facilitate error detection in a radio channel, in a variable length coding process as a final step of coding, the COD flag indicating coding or non-coding is fixed at a certain value (e.g., '0'), for example, and a flag value about a macroblock layer is written as shown at steps S610–S613.

If the COD flag is of a '0', for example, the inputted frame is an I-picture. After writing a MCBCP flag and a CBPY flag as shown at steps S604 and S605, a DQUANT flag is written, for example. If a mode of a macroblock is an Inter mode or an Intra mode, when a DQUANT is 0, it is skipped without being written as shown at steps S606 and S607. Afterward, a motion vector difference value is written. When a macroblock is in the Intra mode, the MVD flag is written. However, if a macroblock is in the Intra mode, there is no need to write as shown at steps S608 and S609.

In the coding method in accordance with the present invention, because a COD flag can not be '1', a decoder can detect an error by checking the COD flag. If an error occurs in a previous macroblock and is not detected (i.e., in some embodiments it is assumed 0 and 1 have occurrence probability of %50 in a bit column) error can be detected as 50% probability, for example, with 1 bit of the COD flag of a present macroblock. Coding efficiency may be slightly lowered according to increase of a bit quantity (about 1%). As such, more accurate error detection can be performed, error restoring performance in radio environment can be improved, and accordingly better picture quality can be obtained.

In the variable length moving picture coding method in accordance with the present invention in video communication using, for example a H.263 moving picture codec, by fixing-coding a certain flag, such as the COD flag in a length variable coding process, it is possible to detect an error occurred in a radio channel, and accordingly data restoring performance can be improved.

What is claimed is:

1. A variable length coding method comprising:
comparing corresponding portions of a present picture and a previous picture received by a video encoder;
writing a COD (coded macroblock indication) flag indicating a picture type of the present picture on the basis of a mode control signal received from a coding controller, when the present picture is determined to be an inter picture type;
determining if the COD flag is equal to a first value indicating lack of motion information in the present picture;
and
setting the COD flag of the present picture to a second value, if the COD flag is equal to the first value, wherein the second value is not equal to the first value so that a decoder can detect an error by checking the value of COD flag.

2. The method of claim 1, wherein said corresponding portions comprise at least one macroblock each, if the COD flag is equal to the first value.

3. The method of claim 1, wherein the second value is approximately equal to "0".

4. The method of claim 1, further comprising:
setting a MCBPC (macroblock type & coded block pattern for chrominance) flag equal to a third value, if the COD flag is equal to the first value.

5. The method of claim 4, wherein the third value is approximately equal to "1".

6. The method of claim 1, further comprising:
setting a CBPY (coded block pattern for luminance) flag equal to a fourth value if the COD flag is equal to the first value.

7. The method of claim 6, wherein the fourth value is approximately equal to "11".

8. The method of claim 1, further comprising:
setting a MVD (motion vector data) flag equal to a fifth value, if the COD flag is equal to the first value.

9. The method of claim 8, wherein the fifth value is approximately equal to "0".

10. A variable length coding method comprising:
determining a coding mode of a macroblock;
writing a COD (coded macroblock indication) flag indicating a picture type of the macroblock on the basis of a mode control signal received from a coding controller, when the macroblock is determined to be an inter picture;
determining if the COD flag is equal to a first value indicating lack of motion information in the macroblock;
changing the COD flag of the macroblock to a second value, if the COD flag is equal to the first value, wherein the second value is not equal to the first value so that a decoder can detect an error by checking the value of COD flag if the COD flag is equal to the first value;
setting a MCBPC (macroblock type & coded block pattern for chrominance) flag to a third value, if the COD flag is equal to the first value;
setting a CBPY (coded block pattern for luminance) flag to a fourth value, if the COD is equal to the first value; and
setting a MVD (motion vector data) flag a fifth value, if the COD is equal to the first value.

11. The method of claim 10, wherein the second value is approximately "0".

12. The method of claim 11, wherein the third value is approximately "1".

13. The method of claim 11, wherein the fourth value is approximately "11".

14. The method of claim 11, wherein the fifth value is approximately "0".

15. A variable length coding system comprising:
means for determining a coding mode of a macroblock;
means for setting a COD (coded macroblock indication) flag of a macroblock header to a first value, when a coding mode of the macroblock is determined to be an Inter mode and the macroblock lacks motion information;
means for determining if the COD flag is equal to a first value indicating lack of motion information in the macroblock;
means for changing the COD flag of the macroblock to a second value, if the COD flag is equal to the first value, wherein the second value is not equal to the first value so that a decoder can detect an error by checking the value of COD flag if the COD flag is equal to the first value;
means for setting a MCBPC (macroblock type & coded block pattern for chrominance) flag to a third value, if the COD flag is equal to the first value;
means for setting a CBPY (coded block pattern for luminance) flag to a fourth value, if the COD flag is equal to the first value; and
means for setting a MVD (motion vector data) flag to a fifth value, if the COD flag is equal to the first value.

16. The system of claim 15, wherein the second value is approximately "0".

17. The system of claim 15, wherein the third value is approximately "1".

18. The system of claim 15, wherein the fourth value is approximately "11".

19. The system of claim 15, wherein the fifth value is approximately "0".

20. A method for variable length coding in a video codec, the method comprising:
determining whether a macroblock is coded in a first mode;
writing a COD (coded macroblock indication) flag, if the macroblock is not coded in the first mode;
determining if the COD flag is equal to a first value;
changing the COD flag to a second value different from the first value so that a decoder can detect an error by checking the value of COD flag if the COD flag is equal to the first value, writing an MCBPC (macroblock type & coded block pattern for chrominance) flag to a third value, writing a CBPY (coded block pattern for luminance) flag to a fourth value, and writing a MVD (motion vector data) flag to a fifth value, in response to the COD flag being equal to the first value;
else, writing an MCBPC flag and CBPY flag; determining whether a differential value of a QP is equal to a sixth value; writing a DQUANT flag, in response to the differential value of the QP being unequal to a sixth value; and writing a motion vector data (MVD) flag, if the macroblock is not coded in the first mode.

21. A variable length coding apparatus of a mobile communication terminal comprising:
a device for comparing corresponding portions of a present picture and a previous picture received by a video encoder;
a device for writing a COD (coded macroblock indication) flag indicating a picture type of the present picture on the basis of a mode control signal received from a coding controller, when the present picture is determined to be an inter picture type;
a device for determining if the COD flag is equal to a first value indicating lack of motion information in the present picture; and
a device for setting the COD flag of the present picture to a second value, if the COD flag is equal to the first value, wherein the second value is not equal to the first value so that a decoder can detect an error by checking the value of COD flag.

22. The apparatus of claim 21, wherein said corresponding portions comprise at least one macroblock each, if the COD flag is equal to the first value.

23. The apparatus of claim 21, wherein the second value is approximately equal to "0".

24. The apparatus of claim 21, further comprising:
a device for setting a MCBPC (macroblock type & coded block pattern for chrominance) flag equal to a third value, if the COD flag is equal to the first value.

25. The apparatus of claim 24, wherein the third value is approximately equal to "1".

26. The apparatus of claim 21, further comprising:
a device for setting a CBPY (coded block pattern for luminance) flag equal to a fourth value if the COD flag is equal to the first value.

27. The apparatus of claim 26, wherein the fourth value is approximately equal to "11".

28. The apparatus of claim 21, further comprising:
a device for setting a MVD (motion vector data) flag equal to a fifth value, if the COD flag is equal to the first value.

29. The apparatus of claim 28, wherein the fifth value is approximately equal to "0".

* * * * *